(12) United States Patent
Filipovic et al.

(10) Patent No.: US 10,631,366 B2
(45) Date of Patent: Apr. 21, 2020

(54) HANDY BASE STATION SYSTEM, DEVICE AND METHOD

(71) Applicants: Zlatko Aurelio Filipovic, San Jose, CA (US); Guan-Wu Wang, Palo Alto, CA (US); Weiping Wang, Palo Alto, CA (US)

(72) Inventors: Zlatko Aurelio Filipovic, San Jose, CA (US); Guan-Wu Wang, Palo Alto, CA (US); Weiping Wang, Palo Alto, CA (US)

(73) Assignee: MICRO MOBIO CORPORATION, Palo Alto, CA (US)

( * ) Notice: Subject to any disclaimer, the term of this patent is extended or adjusted under 35 U.S.C. 154(b) by 154 days.

(21) Appl. No.: 14/658,183

(22) Filed: Mar. 14, 2015

(65) Prior Publication Data

US 2015/0259078 A1 Sep. 17, 2015

Related U.S. Application Data

(60) Provisional application No. 61/953,739, filed on Mar. 15, 2014.

(51) Int. Cl.
| | |
|---|---|
| *H04W 88/08* | (2009.01) |
| *H01K 1/62* | (2006.01) |
| *H01J 61/56* | (2006.01) |
| *F21K 9/20* | (2016.01) |
| *B64C 39/02* | (2006.01) |
| *G05D 1/00* | (2006.01) |
| *F21V 33/00* | (2006.01) |

(Continued)

(52) U.S. Cl.
CPC ............ *H04W 88/08* (2013.01); *B64C 39/024* (2013.01); *F21K 9/20* (2016.08); *G05D 1/0011* (2013.01); *H01J 61/56* (2013.01); *H01K 1/62* (2013.01); *B64C 2201/066* (2013.01); *B64C 2201/146* (2013.01); *F21S 9/022* (2013.01); *F21V 33/0056* (2013.01); *F21V 33/0076* (2013.01); *F21Y 2115/10* (2016.08)

(58) Field of Classification Search
CPC ........................ H05B 37/0272; H04W 88/08
See application file for complete search history.

(56) References Cited

U.S. PATENT DOCUMENTS 3,671,379 A * 6/1972 McCain ............... D01F 8/14
264/172.12
5,365,145 A * 11/1994 Fields ................. H02J 9/02
307/66

(Continued)

*Primary Examiner* — Philip J Bonzell
*Assistant Examiner* — Michael B. Kreiner
(74) *Attorney, Agent, or Firm* — Roark IP

(57) ABSTRACT

A Handy Base Station (HBS) which is capable of connecting through a base portion into a power socket (e.g., lamp socket). The HBS may have a plurality of functional modules capable of being detachably mounted in a housing. One of the functional modules may be a light emitter such as a light emitting diode (LED). Another rmodule may be a communication module which may communicate using a wire line or wirelessly using standard wireless communication protocols. Further disclosed is a combination unit which has the HBS located on a pole such as a utility pole with a landing pad for an unmanned aerial vehicle (UAV) to allow the UAV a recharging location between deliveries and to allow the HBS to guide the UAV on its flight.

24 Claims, 19 Drawing Sheets

(51) Int. Cl.
  *F21S 9/02* (2006.01)
  *F21Y 115/10* (2016.01)

(56) References Cited

U.S. PATENT DOCUMENTS

| | | | |
|---|---|---|---|
| 6,810,817 B1 | 11/2004 | James | |
| 7,072,668 B2 | 7/2006 | Chou | |
| 7,133,697 B2* | 11/2006 | Judd | H01Q 1/246 |
| | | | 455/561 |
| 7,196,621 B2 | 3/2007 | Kochis | |
| 7,265,668 B1 | 9/2007 | Brosius | |
| 7,356,390 B2 | 4/2008 | Knoblach | |
| 7,660,345 B2* | 2/2010 | Yu | H04B 3/44 |
| | | | 375/219 |
| 8,511,606 B1 | 8/2013 | Lutke et al. | |
| 8,826,046 B2* | 9/2014 | Lu | H04L 12/2807 |
| | | | 700/295 |
| 8,831,601 B2* | 9/2014 | Mitchell | H04B 7/18506 |
| | | | 455/431 |
| 8,880,241 B2 | 11/2014 | Mohamadi | |
| 9,130,651 B2* | 9/2015 | Tabe | H04B 1/3838 |
| 9,369,370 B2* | 6/2016 | Chow | H04L 41/083 |
| 9,413,502 B2* | 8/2016 | Tellado | H04L 5/0037 |
| 9,504,099 B2* | 11/2016 | McGuire | H05B 33/08 |
| 9,572,101 B2* | 2/2017 | Kamijoh | H04W 64/00 |
| 9,847,944 B2* | 12/2017 | Chow | H04L 47/781 |
| 10,064,095 B2* | 8/2018 | Kerpez | H04W 72/0406 |
| 2006/0152344 A1* | 7/2006 | Mowery, Jr. | H04B 3/542 |
| | | | 370/331 |
| 2007/0171888 A1 | 7/2007 | Adams | |
| 2008/0149403 A1 | 6/2008 | Fein et al. | |
| 2008/0150295 A1 | 6/2008 | Fein et al. | |
| 2008/0163919 A1 | 7/2008 | Fein et al. | |
| 2009/0099761 A1 | 4/2009 | Davis et al. | |
| 2009/0294576 A1 | 12/2009 | LaForge | |
| 2010/0231163 A1 | 9/2010 | Mashinsky | |
| 2010/0292877 A1 | 11/2010 | Lee | |
| 2011/0140656 A1 | 6/2011 | Starr et al. | |
| 2011/0202221 A1 | 8/2011 | Sobue et al. | |
| 2011/0250819 A1* | 10/2011 | Tashman | A63H 33/18 |
| | | | 446/46 |
| 2012/0120243 A1* | 5/2012 | Chien | H04N 5/2354 |
| | | | 348/159 |
| 2012/0158229 A1 | 6/2012 | Schaefer | |
| 2013/0081245 A1 | 4/2013 | Vavrina | |
| 2013/0200703 A1* | 8/2013 | Liao | H05B 37/0272 |
| | | | 307/31 |
| 2013/0217445 A1* | 8/2013 | Chan | H04M 1/0254 |
| | | | 455/566 |
| 2014/0032034 A1 | 1/2014 | Raptopoulos | |
| 2014/0172194 A1 | 6/2014 | Levien et al. | |
| 2014/0172354 A1* | 6/2014 | Chu | G01S 5/0231 |
| | | | 702/150 |
| 2014/0203939 A1* | 7/2014 | Harrington | H04M 11/04 |
| | | | 340/584 |
| 2014/0273892 A1* | 9/2014 | Nourbakhsh | H04B 1/3827 |
| | | | 455/90.3 |
| 2014/0376370 A1* | 12/2014 | Cioffi | H04L 61/2514 |
| | | | 370/230 |
| 2015/0016330 A1* | 1/2015 | Schwartz | H04W 8/26 |
| | | | 370/312 |
| 2015/0158599 A1 | 6/2015 | Sisko | |
| 2019/0223235 A1* | 7/2019 | Schwartz | H04B 7/15507 |

* cited by examiner

HANDY BASE STATION SYSTEM, DEVICE AND METHOD

CROSS-REFERENCE TO RELATED PATENT APPLICATIONS

The present invention claims priority from U.S. Provisional Patent Application Ser. No. 61/953,739, filed Mar. 15, 2014, the disclosure of which is herein specifically incorporated by reference in its entirety.

FIELD OF THE INVENTION

The present invention relates generally to a housing having a plurality of functional modules capable of being fitted into a power source and an Unmanned Aerial Vehicle (UAV) control, charging and landing station.

BACKGROUND

Incandescent lamps using a tungsten filament are still popular for use as various indicator lamps installed in buildings for offices, condominiums, and public facilities. These lamps provide a plurality of sources of readily available power supplies.

SUMMARY

Aspects of the disclosure include a Handy Base Station (HBS) comprising: a housing having a base portion that is capable of being fitted into a lamp source socket; and a communication module which is capable of receiving from and transmitting to at least one remote wireless device.

Aspects of the disclosure further include a system comprising: a plurality of poles each having a Handy Base Station (HBS) mounted thereon; each HBS having a base portion that is capable of being fitted into a power source socket and a communication module which is capable of receiving from and transmitting to at least one drone; and each of said plurality of poles having a platform capable of charging the at least one drone.

Aspects of the disclosure further include a system comprising: a plurality of poles each having a Handy Base Station (HBS) mounted thereon; each HBS having a base portion that is capable of being fitted into a power source socket and a communication module which is capable of transmitting to a remote wireless terminal(s).

Aspects of this disclosure may further include a system comprising: a light post having a light fixture; and a landing platform connected to the post and having a charging station capable of recharging an unmanned aerial vehicle (UAV). The charging station may include direct metal contacts integrated into the landing platform for charging the UAV. The charging station may further comprise a transmission wires capable of wirelessly charging a UAV. The transmission wires may also form a transmission coil. The system may further comprise a lamp factor housing attached to the light fixture, wherein the lamp factor housing includes: a base portion that is capable of being screwed into a light-bulb socket; a light-emitting portion that includes a plurality of LEDs which are controlled by a processor; and a communication module also coupled to the processor and which is capable of receiving communications from and transmitting communications to the UAV. The plurality of LEDs may be configured to be off while the communication module is still operating. The landing platform may include a plurality of magnets configured to hold a UAV in position for charging. The landing platform may further comprise: a module for generating a laser beam capable of guiding a UAV to the landing platform. The laser beam may be pulsed and/or modulated to guide the UAV. The lamp factor housing may be capable of wirelessly controlling the UAV when it is within range. In the system, the landing platform may have a plurality of attachments so that it is capable of being affixed to the side of a building. A beacon may be mounted on the light post which is capable of sending signals to and receiving signals from a UAV and wherein the beacon may communicate with the UAVs using a wireless standard selected from the group consisting of: 3G, 4G, 5G, WiFi, WiFi Direct, Bluetooth®, and WiMax®. In the system, the landing platform may have a communication module which is capable of forwarding signals received on the status of a UAV and be capable of electronically paying for goods dropped off by the UAV through the beacon in a wireless link with the UAV.

Further aspects of the disclosure may include a system comprising: a plurality of poles each having Handy Base Stations (HBS's) mounted thereon; each HBS having a base portion that is capable of being fitted into a power source socket and a communication module which is capable of transmitting to a remote wireless terminal. The communication module communicates to the remote wireless terminal in at least one communication standard of the group consisting of: microwave and millimeter wave (mm-wave). The network is a backhaul fiber optic. The remote wireless terminal is located in one of the group consisting of a: vehicle, aerial drone, another HBS, and a mobile device.

Further aspects of the disclosure may include a system comprising: a plurality of vehicles each having Handy Base Stations (HBS's) mounted thereon; each HBS having a base portion that is capable of being fitted into a power source socket and a communication module which is capable of transmitting to a remote wireless terminal. The communication module communicates to the remote wireless terminal(s) in at least one communication standard of the group consisting of: microwave and millimeter wave (mm-wave). The remote wireless terminal is located in or mounted on one of the group of moving objects consisting of a: automotive vehicle, Unmanned Aerial Vehicle (UAV), another HBS, and a mobile device. At least one of the HBS's includes a power module configured to provide electricity to other modules in the HBS generated from kinetic energy of the vehicle. At least one of the plurality of vehicles is an Unmanned Aerial Vehicle (UAV). The communication module communicates to the remote wireless terminal at least one of the group consisting of: sensor data, image data, video data, and vehicle control and command data.

Further aspects of the disclosure may include a system comprising: a plurality of light posts each having a light fixture; a landing platform connected to each of the plurality of light posts and each said landing platform having a charging station capable of recharging an unmanned aerial vehicle (UAV); and wherein each of the landing platforms has a communication device capable of tracking UAVs.

Further aspects of the disclosure may include a method comprising: landing a UAV on a lamp post containing a charging station; and wirelessly charging through induction a UAV. The lamp post may include a lamp factor housing which has a communication module which receives communications from and transmits communications to the UAV. The method may further include guiding the UAV to the charging station using a laser. The method of may further comprise: holding the UAV in place during charging using magnets.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
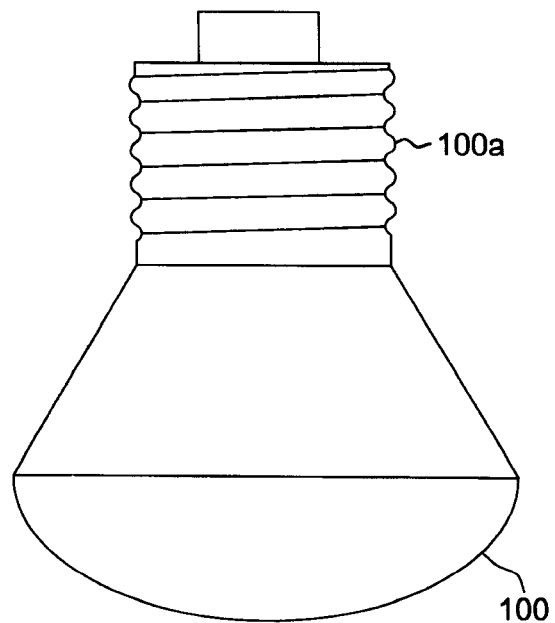
FIG. 1 is a side view of a typical housing for a Handy Base Station (HBS).

In the following description, numerous details are set forth to provide a more thorough explanation of embodiments of the present invention. It will be apparent, however, to one skilled in the art, that embodiments of the present invention may be practiced without these specific details. In other instances, structures and devices are shown in block diagram form, rather than in detail, in order to avoid obscuring embodiments of the present invention.

One of the major difficulties of in the Internet of Things (IOT), connected environments, and/or network black spots is the lack of easy access to power and data backhaul. Such environments require expensive deployments such as site acquisitions and digging roads for backhaul. These are some of the type of problems address by the methods and systems disclosed herein. Sockets acting as a power source for housings (e.g., such as light emitter housings) can be found everywhere (vehicles, walls, street corners, signs, poles, etc.) therefore making it an ideal location for a Handy Base Station (HBS) described herein. With an ease of access to Alternating Current (AC)/Direct Current (DC) power lines, an HBS having access to a power source can easily transform any location into an IOTs, connected environment to form a patch of network black spots. With, for example, a lamp base, the HBS can be easily installed into a standard power socket of a lamp, a lighting fixture, or a light pole and be connected to a power line. The power socket can be indoor in buildings or outdoors on public or private properties (e.g., public lands, parking lots, streets, roads, highways, or on vehicles). HBS can use the power lines or Ethernet over Power Lines to draw power and for data backhaul. The HBS could also have a built in wireless backhaul module to provide wireless data backhaul. HBS can function as an Access Point, a small cell (e.g., pico, femto, macro micro), a repeater, a backhaul point, public safety system, and/or early warning system. HBS can use wireless standards, such as third generation of mobile telecommunications technology (3G), fourth generation of mobile telecommunications technology (4G), fifth generation mobile networks (5G), Wireless Fidelity (IEEE 802.11-WiFi), millimeter wave (mm-wave), microwave, Worldwide Interoperability for Microwave Access (IEEE 802.16-WiMAX), Long Term Evolution, and other similar standards allowing for quick and cost effective network coverage. HBS can be equipped with cameras, lights, sensors (e.g., smoke, temperature, wind and airflow, carbon monoxide), three dimensional image mapping, infrared sensor, long and short range motion sensors, speaker(s), microphone(s), biochemical sensor(s), sound, ultra sound emitter/receiver, and/or radar. All these sensors and components can provide critical data for policing, early warnings, and/or home safety.

In other applications, most vehicles are not connected and do not have collision avoidance systems. A version of the HBS can be installed into a vehicles' light emitter housing to make vehicles smart and to assist drivers in avoiding accidents. The HBS could be installed in the front, back or side of vehicles.

In other embodiments disclosed herein, as Unmanned Aerial Vehicles (UAV's) cover longer and longer miles in rural and densely populated areas, UAV's battery life and long distance communications will be the key to a successful UAV deployment. In order for UAV's to fly long distance constant battery charging is a must as battery capacity on UAV's is quite small due to payload/cost requirements. Keeping communication open with a long distance UAV is also critical. Today's technology allows UAV's to fly short distance/short time with short distance communication and navigation. Communication between an HBS and a UAV might include communications of sensor data, image data, video data and UAV control and command data. As will be discussed herein the communication relationship between an HBS mounted on a pole, building, hilltop or similarly situation spot and a UAV can also be implemented between an HBS and a land-based vehicle, a manned aerial vehicle and/or a marine vessel. The HBS may conduct communications with all three types of vehicles simultaneously depending on the type of communication modules integrated into the HBS. The communication with these 4 type of vehicles (UAV, manned aerial vehicle, land vehicle, and/or marine vessel) may occur while they are stationary or in motion. A network of HBS's can relay high rate data such as sensor, image and/or video data from the 4 types of vehicles to cloud servers or vehicles/traffic control centers. Another feature that may be integrated into the HBS is a UAV landing module. The UAV landing module may contain navigation and wireless communication functions or, alternatively, the UAV landing module might be coupled to a separate navigation module and wireless communication module. A UAV charging pad might also be coupled electronically to the HBS for control and charging of a UAV.

The Handy Base Station (HBS) may have a plurality of electronic devices and functions integrated inside a housing having access to standard power socket. For example, the HBS may be contained in a traditional lamp form factor housing. (The HBS may also be referred to interchangeably in this description as a "Smart Lightcan"). In the following description, alternative embodiments of the HBS are described including reference numerals 100, 300, 300a, 400, 702, 1200, 1204, 1206, 1306a, 1308a, 1310a, 1312a-1312d, 1404 and 1504 in FIGS. 1-16J. It is to be understand that the electronic and mechanical devices and functions described with respect to one exemplary embodiment of the HBS can be used in part or in whole in the other exemplary embodiments as well even if the electrical and mechanical devices and functions are not specifically shown in a particular embodiment but rather described in a different embodiment.

Figure 2:
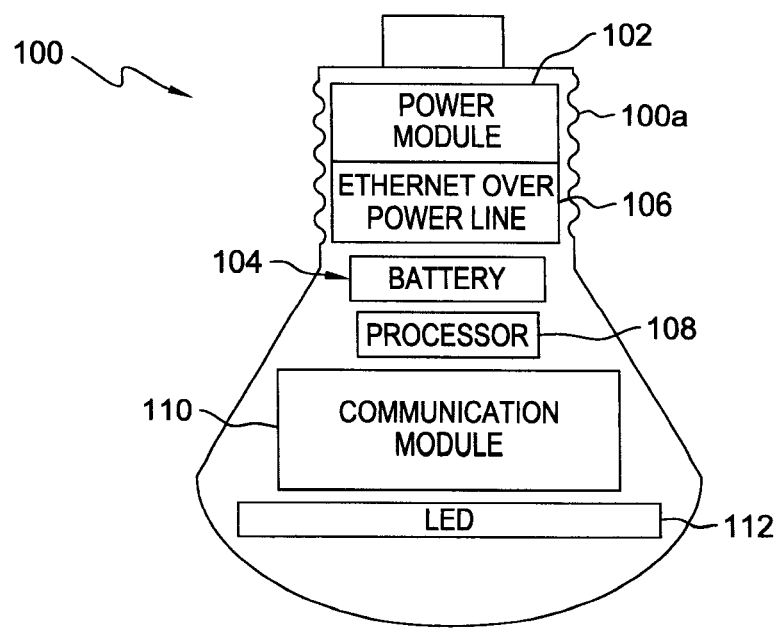
FIG. 2 is a cross-sectional view of the HBS of FIG. 1.

FIG. 1 is a side view of an HBS 100 having an attachment section or base (e.g., screw) 100a for attaching the housing 100 to a corresponding power socket of a light fixture (not shown). For example, the attachment section is typically constructed to be capable of being fitted into a conventional light socket. Therefore, the HBS 100 can be easily installed by screwing, using prongs or some other form of attachment into a power source socket located on a street light post, house ceiling, vehicles, or a variety of other installations. FIG. 2 is a cross-sectional view of the HBS 100 of FIG. 1. The housing of the HBS 100 may provide light by a light emitting diode (LED) or a plurality of LEDs, incandescent bulb(s), fluorescent light(s), sodium light(s) or similar to light up the house, streets, parking lot, and/or show the road at night for cars. In an alternative embodiment, the HBS 100 may not include any lighting emitting element but still have a housing capable of being plugged, screwed or connected through some other form of attachment into a power socket.

The housing of HBS 100 shown in FIG. 2 includes a power module 102, a communication module 110, a light emitting source module (e.g., LED) 112, processor 108, and sensors (not shown). The modules may be miniaturized and as they are plugged into the HBS 100 they are configured to establish an electrical connection with, for example, a universal serial bus (USB) that runs throughout the HBS 100. The modules may be fitted into slots on a core section of the HBS 100. In alternative embodiments, the HBS 100 could contain a printed circuit board into which the modules are plugged. The modules are functional modules and all or a subset of all of the modules may be detachable from the HBS 100 as discussed below. With a light bulb screw-in base 100a, the HBS 100 can easily be installed into the power socket of a lamp, a lighting fixture, or a light pole connecting to a power line from the main power grid or another power generator. Such a power socket can be indoor in buildings or outdoor in private properties, public lands, parking lots, streets, roads, highways, or on vehicles. Power module 102 is used to deliver and control power to the components and modules of the HBS 100. The HBS 100 draws power from the power line to feed the power module 102. The power module 102 may further include a backup battery 104 for operation when the power line is not providing power. If the optional, detachable backup battery 104 is present it may be charged by the power module 102. The power module 102 may include a switch, an alternating current (AC)/direct current (DC) converter for AC power source, or a DC/DC converter for DC power source for voltages suitable to operate other modules such as the communication module, light emitter 112, sensors and any other electrical/mechanical components or modules located in the HBS 100. The USB may be used to electrically connect the modules and components such as LED 112 to the power module 102. The power module 102 may also be configured to provide electricity generated from kinetic energy gained due to movement of the HBS 100 from being mounted on a vehicle (e.g., acceleration and deceleration of the vehicle). Ethernet over Power Line unit 106 may be connected to the power module 102 or be part of the power module 102 and enable wired communication on the part of the HBS 100 typically through a utility company which provides their own Internet service. Processor 108 controls the operation of the HBS 100 and may be an ARM® processor or other similar type. Any of the functions described herein with reference to FIGS. 1-16J may be controlled by the processor 108 located in an HBS.

Communication module 110 is coupled to the processor 108 and Ethernet over Power Line unit 106 and is used for communication, networking, command and control. The communication module 110 may be used to send and receive data or forward the data to a second HBS (either wirelessly or over a hardline such as by Ethernet Over Power Line) typically located nearby. The control module 110 may allow for a wireless connection to an access point (AP) (e.g., WiFi Access Point) with the Ethernet as a source for wireless backhaul. The term "backhaul" as used in this description shall be the implementation of wireless communications systems to transfer data from an end user to a node in a major network such as the Internet. The communication module 110 can be a wired type which communicates using wire line(s), e.g., Ethernet over Power Line. Alternatively, the communication module 110 can be wireless type using standard wireless communication protocols to interact with local mobile devices, a base station, and/or another HBS. Communication protocols may include Global System for Mobile Communication (GSM), Enhanced Data GSM Environment (EDGE), Code Division Multiple Access (CDMA), Wideband CDMA (WCDMA), Long Term Evolution (LTE) cellular Wireless Wide Area Network (WWAN) standards, Wireless Local Area Network (WLAN) IEEE 802.11 Wi-Fi standards, Worldwide Interoperability for Microwave Access (WiMax), Millimeter Wave Wireless Communications (mm-wave), microwave and/or Zigbee®. In remote areas, the HBS 100 may transfer data by satellite based communications, drones, and/or hovering blimps. The HBS 100 may also act as a client or a host for other wireless devices or Handy Base Stations. The HBS 100 can wirelessly detect other Handy Base Stations within the area automatically and may also control the other Handy Base Stations or be controlled by them. The HBS 100 in turn may also be controlled by users via a mobile communication device, personal computer (PC), mobile phone tablet or other device. Typically, a software application on these devices would be used as a control means. Functionally, the HBS 100 may be used as a repeater, Access Point, mesh network, small cell (e.g., picocell, femtocell, macrocell, microcell, etc.), public safety system, early warning system, and/or (as previously discussed) a backhaul point.

Figure 3A:
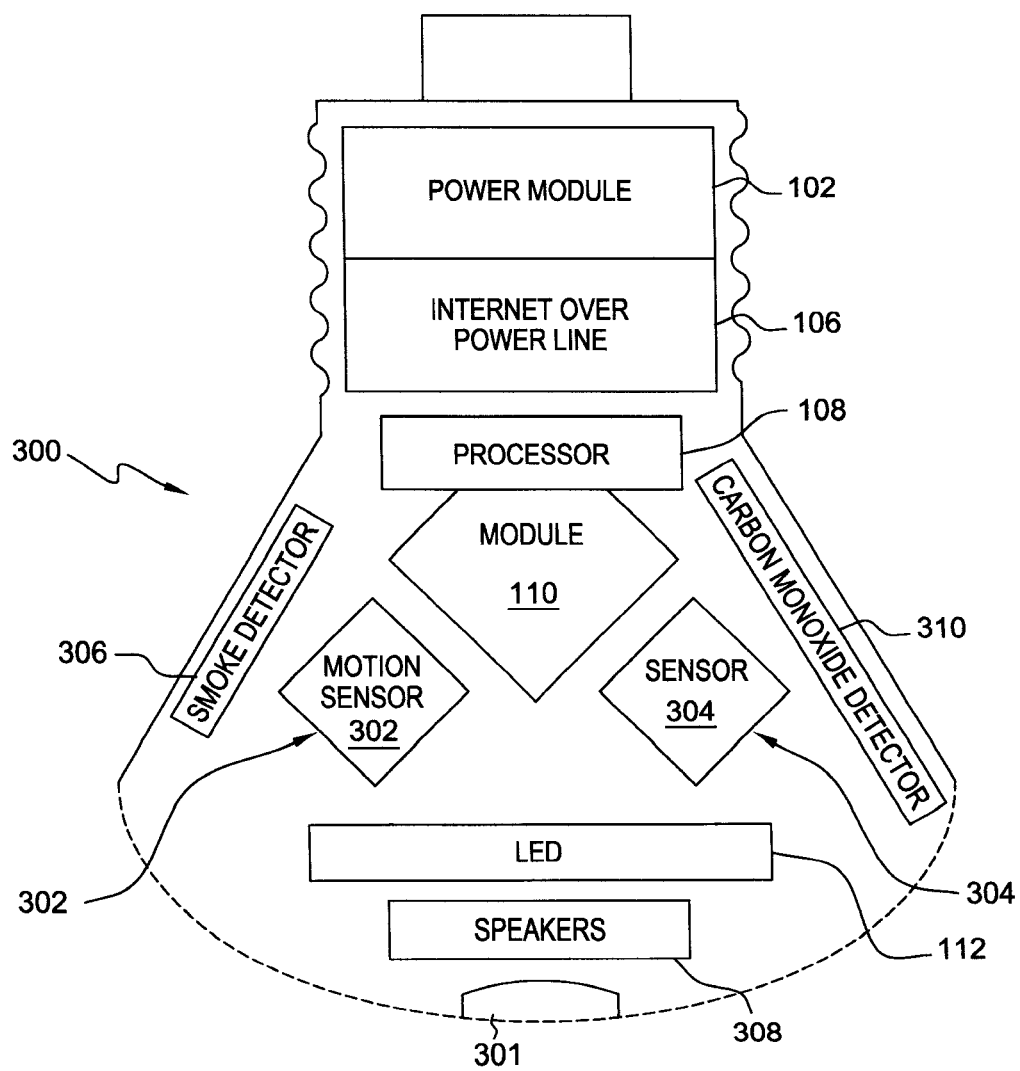
FIG. 3A is a cross-sectional view of an alternative embodiment of the HBS.

In FIG. 3A, an alternative embodiment of the HBS 300 is illustrated in cross-section which may contain a camera(s) 301, light(s) 112, long and short range motion sensor 302, environmental sensors (light, temperature, electrical, wind/airflow, nitrogen biochemical, chemical, sound, particle, proximity) 304, smoke detector 306, speakers 308, and carbon monoxide detector 310. Also, not shown in FIG. 3A, but which may be included are a microphone(s), ultra sound emitter and receiver, and/or a radar(s). Each of these functional elements may be in the form of a detachable module which can be added to or detached from the customizable housing of HBS 300 depending on the application required. The HBS 300 may be used to transmit all the data from the sensors to a user's mobile device via wireless or wired connection. The camera(s) 301 may be used for three dimensional (3D) image mapping and/or infrared sensing. The camera(s) may also be used, for example, to monitor a babysitter. The plurality of environmental sensors may be used for sensing disruption of the environment and then reporting the disturbance through the communication module 110. The communication module 110 may be configured to send customizable, pre-recorded distress signals to an emergency service provider (e.g., 911) upon the detection of a disturbance. The speakers 308 can be used to play music or sound an alarm. Carbon monoxide detector 310 may be used to detect the presence and/or increase of carbon monoxide. Light (e.g., LED) 112 may be turned ON and OFF during the day or night by sensor 304 (e.g., light sensor).

Figure 3B:
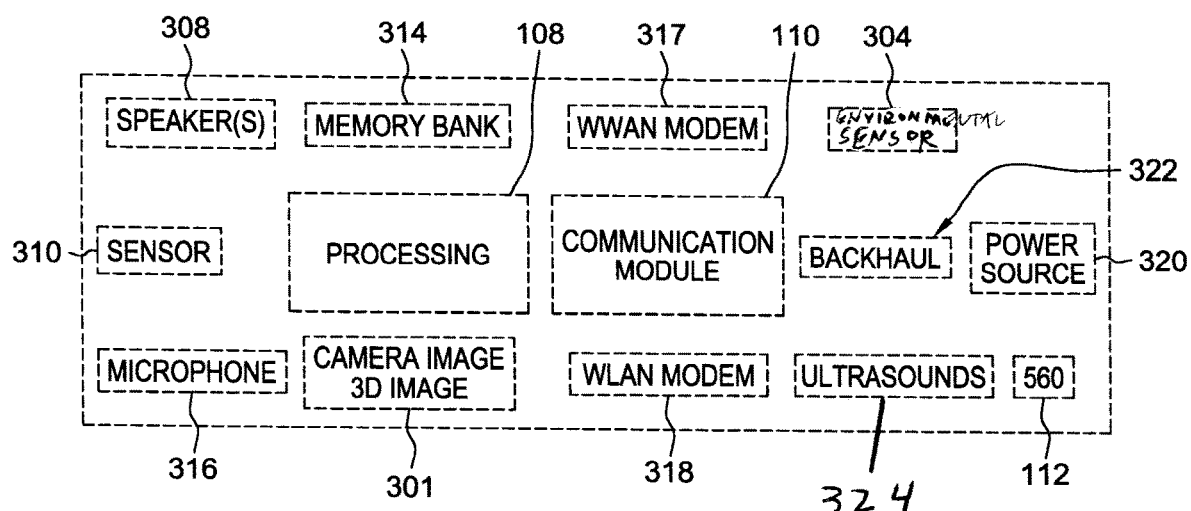
FIG. 3B is a block diagram representation of another alternative embodiment of the HBS of FIG. 1.

FIG. 3B shows an alternative embodiment wherein HBS 300a is shown in a block diagram which may be in a housing similar to that of the HBS 300 or a different type of housing. HBS 300a has similar and additional modules than that of HBS 100 and 300 for enhanced functionalities. Sensor module 310 may be made up any or all of the following type of detachable sensors: fire detection, carbon monoxide, temperature sensor, and/or three-dimensional mapping of a temperature field. Reference numeral 314 is a detachable memory bank for storing information useful to the HBS 300a. Reference item 316 indicates a microphone for detecting sounds in the environment of the HBS. Wireless Wide Area Network (WWAN) Modem 317 may include a baseband, radio frequency integrated circuit (RFIC), radio frequency front end module (RF FEM), and is able to connect to mobile networks through communication standards such as 3G, 4G and 5G. The HBS 300a may also include a Wireless Local Area Network (WLAN) modem 318 to connect through WiFi and Zigbee®. Connections from HBS 300a can be made via Near Field Communications (NFC), Bluetooth®, WHDMI, etc. Item 320 is a power source which can obtain power directly from a power line. In this embodiment, communication (or connectivity processing) module 110 could have multiple radios inside to be used as repeaters. Backhaul 322 could be Ethernet over Power Line. LED (or a plurality of LEDs) 112 again provides a lighting function in this embodiment of the HBS. Sensor 324 performs an ultrasound function such as measuring the distance of an object.

Figure 4:
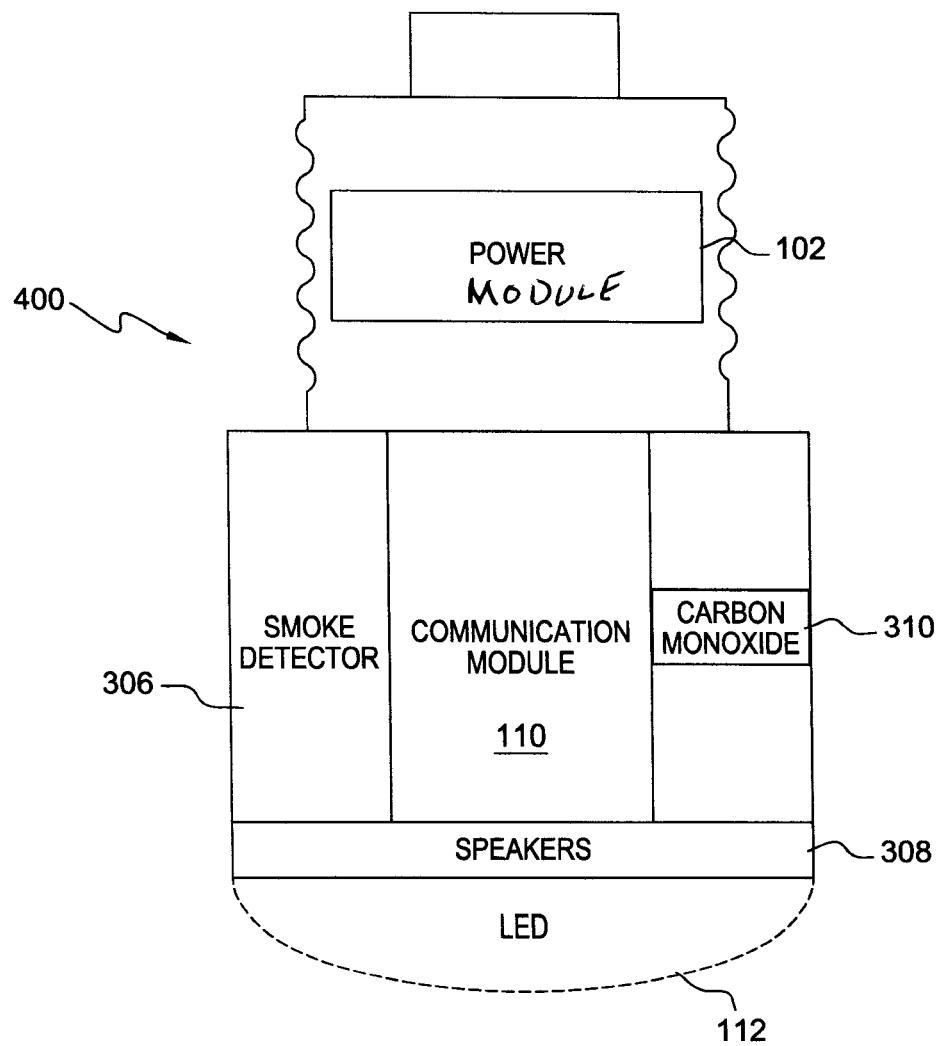
FIG. 4 illustrates a cross-sectional view of a modular version of the HBS
Figure 5:
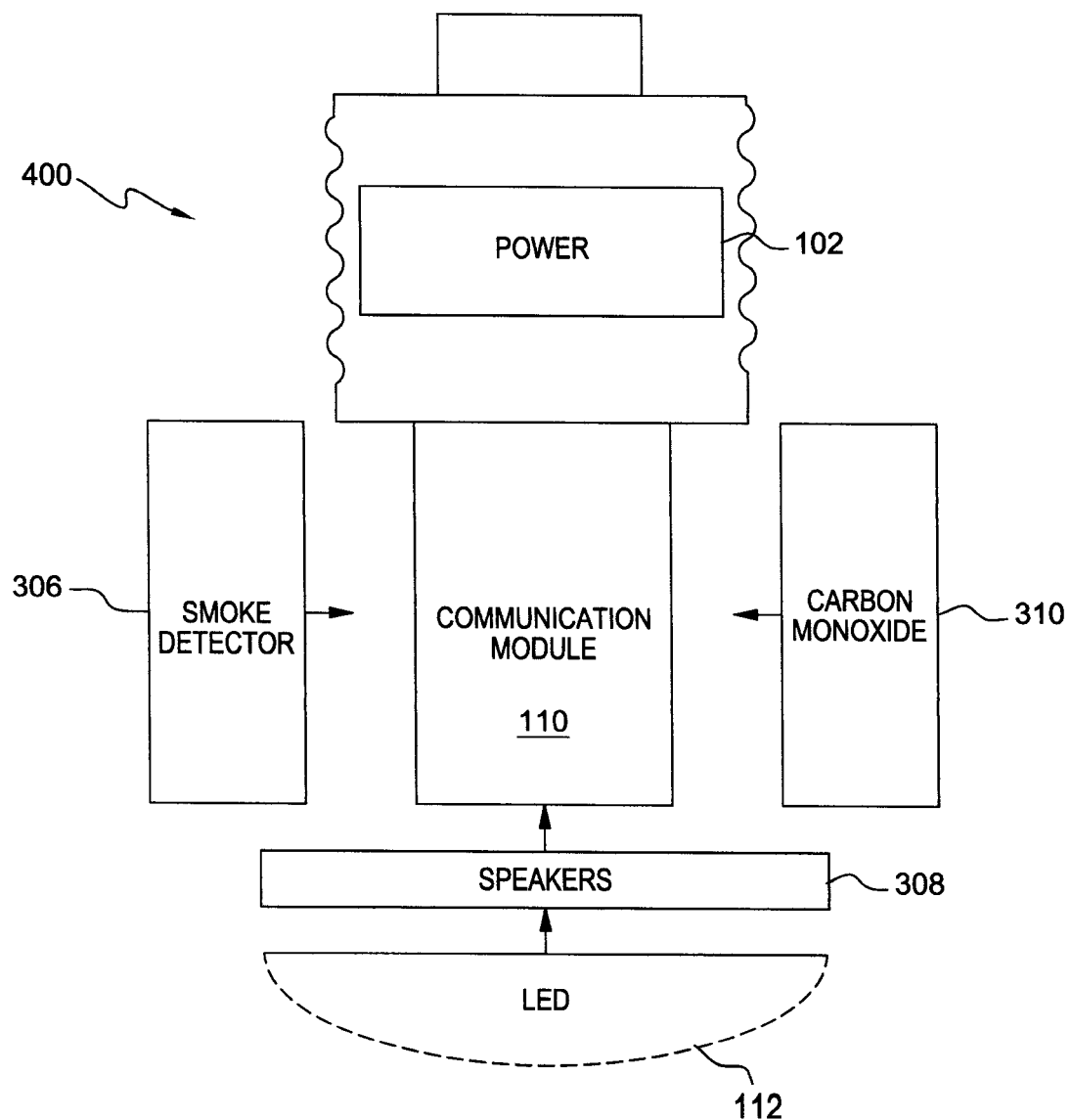
FIG. 5 is a cross-sectional exploded view of FIG. 4.

FIG. 4 shows another modular version of the Handy Base Station (HBS 400) and FIG. 5 is an exploded view of FIG. 4. HBS 400 is customizable and allows users to add or detach all (or substantially all) the functional modules. This modularity decreases the cost of the Handy Base Station and allows for a customizable HBS housing. Each HBS 100, 300, 300a and other HBS's described below may modular with detachable functional modules as shown in FIG. 4.

Figure 6A:
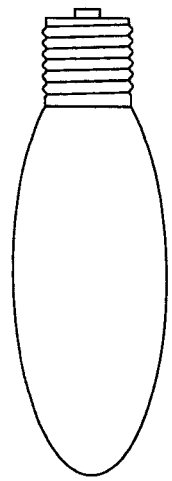
FIGS. 6A-6J illustrate a variety of lamp housings in which the HBS may be contained.
Figure 6B:
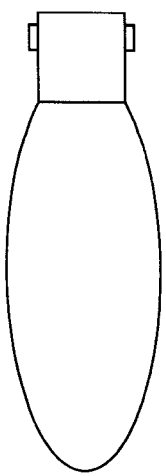
Figure 6C:
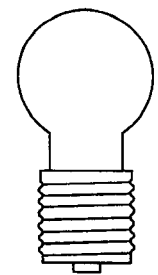
Figure 6D:
Figure 6E:
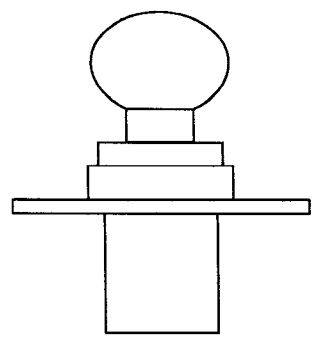
Figure 6F:
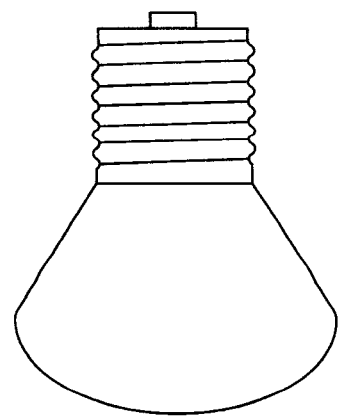
Figure 6G:
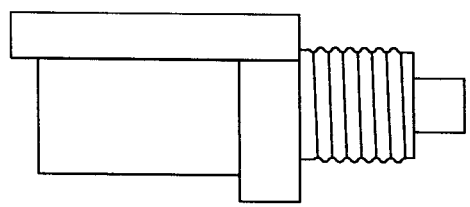
Figure 6H:
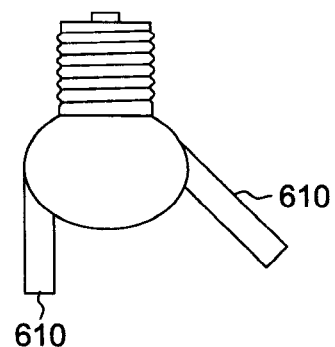
Figure 6I:
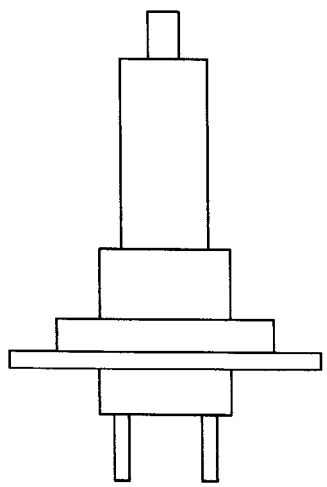
Figure 6J:
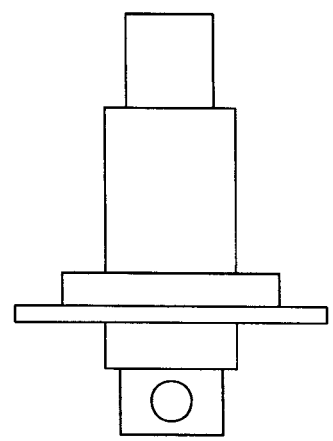

FIGS. 6A-6J discloses a variety of shapes and sizes for the previously disclosed HBS housings 100, 300, 300a and 400. The HBS housing may have an attachment capacity in the form of a screw base or bayonet cap which can easily be connected to standard power sockets of incandescent lamps or sodium lamps which are commonly used as indoor or outdoor electrical lighting. Technical standards for lamp bases which may used as the attachment device for any of the HBS's 100, 300, 300a and/or 400 include ANSI standard C81.67 and IEC standard 60061-1. These are common commercial lamp sizes for easy adaptation to household lamp sockets and street light poles. The car lamp versions of the HBS can include cab base P14.5, PX26d, PGJ23t-1, P22d 90 degrees, or BA20d. Also, the HBS can be located in a brake lamp or headlights lamps for use in a vehicle. FIG. 6H shows antennas 610 protruding from the HBS housing for wireless communication with other wireless devices. In alternative embodiments, these antennas 610 can be located inside the HBS housing. One of the benefits of the HBS is that it can benefit from the large installed base of fixtures to provide a new solution able to operate effectively in an older installed environment.

Figure 7:
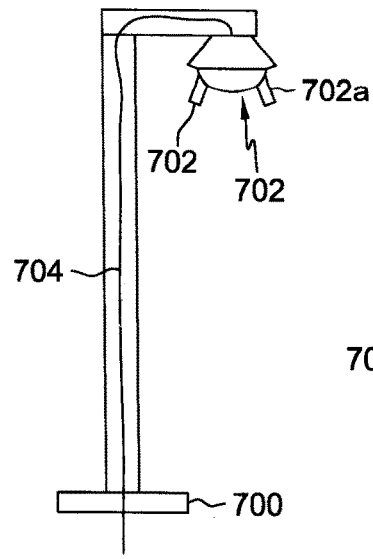
FIG. 7 shows a light pole with an HBS lamp installed in the fixture.

FIG. 7 illustrates a light post 700 having HBS housing 702 attached which could be one of the HBS embodiments 100, 300, 300a or 400. The HBS housing 702 has an antenna 702a protruding from each side to increase its transmission and reception range. The light post 700 may be located, for example, in a parking lot, a row of street lights, a national park or a house. Reference numeral 704 illustrates the backhaul over power line (e.g., Ethernet over Power Line) which may connect to a network (e.g., Internet) over the main power line. The main power line is also used to power the HBS housing 702. The HBS housing 702 can also contain a backup battery in case the main power goes down. As previously discussed, the HBS housing 702 in this embodiment can function as a macrocell, microcell, picocell, femtocell, distributed antenna system (DAS), WiFi Access Point (AP), wireless backhaul, mm-wave system, microwave system or repeater. For the purposes of this description, a macrocell has a range of greater than 2 kilometers wide or more; microcell has a range of approximately two kilometers wide or less; a picocell has a range of approximately 200 meters or less; and a femtocell has a range of approximately 10 meters or less. As discussed, the mm-wave communications will typically operate in the range of 30 GHz to 300 GHz. Note that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9). When in the same way that repeaters are an auxiliary wireless base station for a given network, when an HBS 702 (or HBS 100, 300, 300a and 400) is an Access Point it also provides wireless connectivity that you want in that particular part of your network. However, instead of repeating signal. These HBS's 702 may take a direct feed from the router straight into the back of the Access Point itself.

Figure 8A:
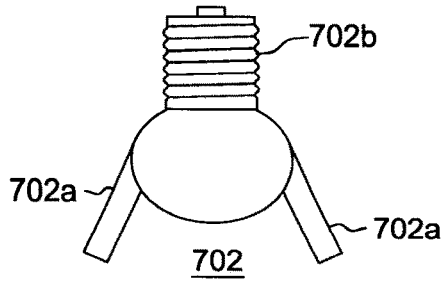
FIGS. 8A-8B show HBS lamps that may be installed in the light pole of FIG. 7.
Figure 8B:
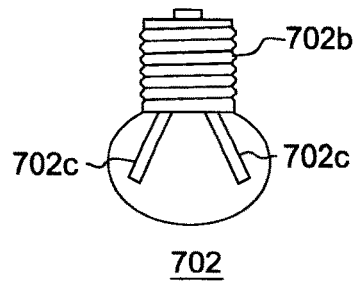

FIG. 8A shows an HBS housing 702 which can be used in the light post 700. It has a light bulb socket connector 702b in addition to the external antennas 702a. The HBS housing 702 may contain a light with light sensor as previously described. FIG. 8B shows an alternative embodiment of the HBS housing 702 in which antennas 702c are embedded inside the HBS 702. As previously discussed, the HBS housing 702 may include a camera for monitoring, 3D imaging mapping, weather sensor, fire sensing, and/or carbon monoxide sensing as discussed with regard to HBS 100, 300, 300a and/or 400.

Figure 9:
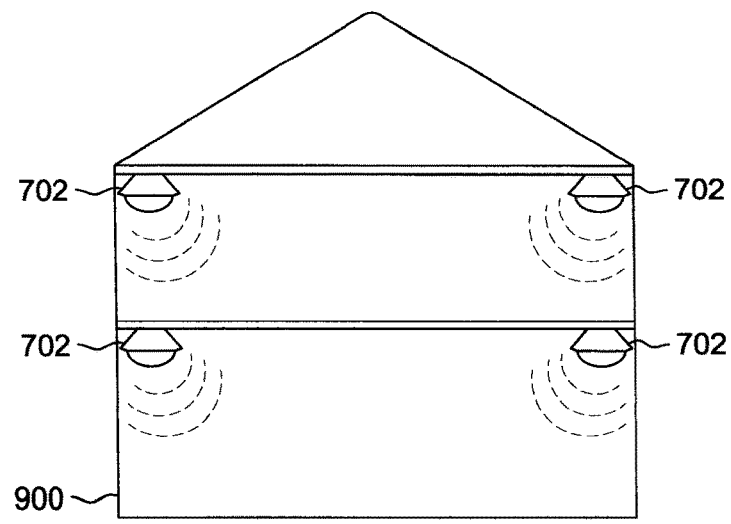
FIGS. 9 and 10 illustrate a plurality of HBS's in operation inside a building.
Figure 10:
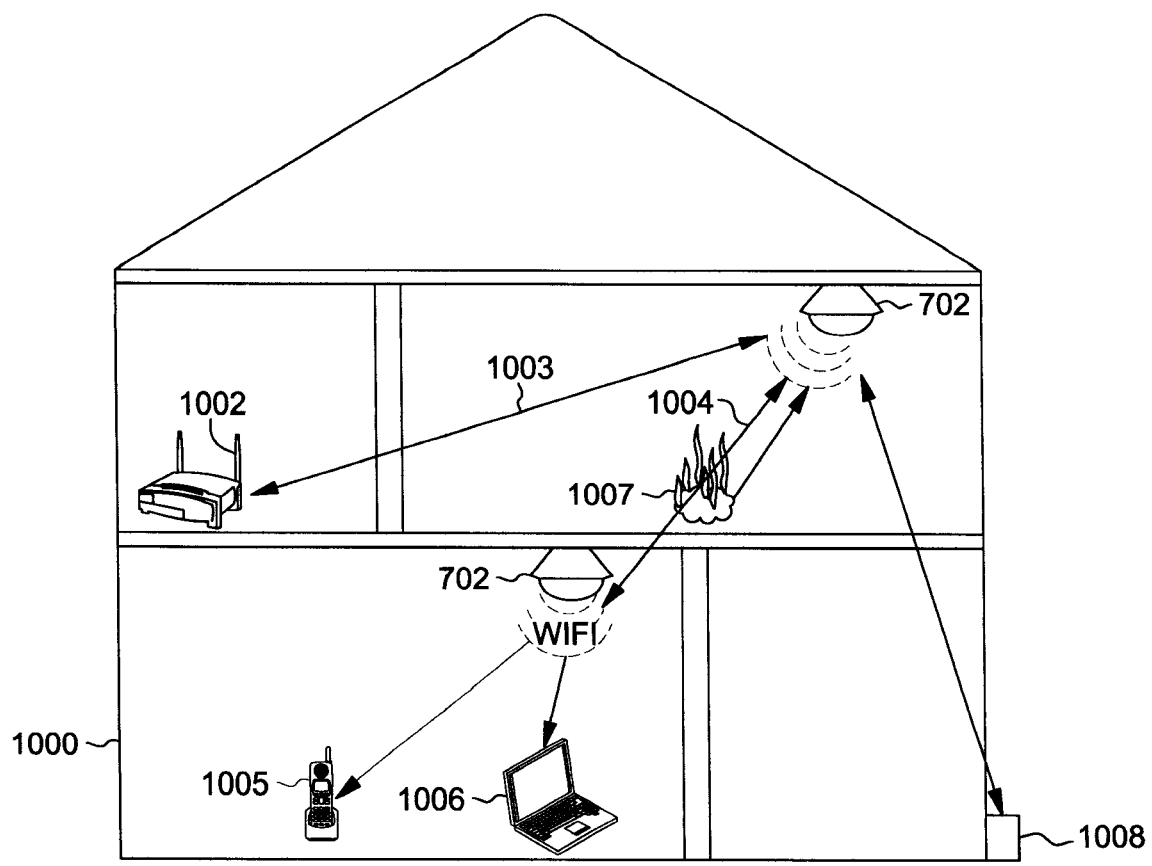

FIG. 9 shows a plurality of HBS's 702 operating inside a building 900. Ideally, these embodiments of the HBS's may include fire sensors, carbon monoxide sensors, cameras, wireless connectivity and automatic warning signals. They also could be used for 3D image mapping to import Auto-CAD or other similar software. FIG. 10 illustrates a building 1000 such as a personal residence having at least two HBS's 702. Access Point (AP) or small cell 1002 is in wireless communication 1003 with an HBS 702 using communication standards WiFi, WiFi Direct, 3G, 4G, mm-wave, microwave, etc. The HBS's 702 are also in wireless communication 1004 with each other also using WiFi, WiFi Direct, 3G, 4G, mm-wave, microwave, etc. Personal devices such as phone or tablet 1005 and computer 1006 may connect wirelessly (e.g., WiFi, WiFi Direct, Bluetooth) with the HBS's as shown in FIG. 10. In the event of a fire 1007, an HBS 702 is capable of sensing the smoke, heat and/or carbon monoxide and send a signal to a main power switch 1008 to shut off power to the building 1000 and send a distress notification to a central location.

Figure 11:
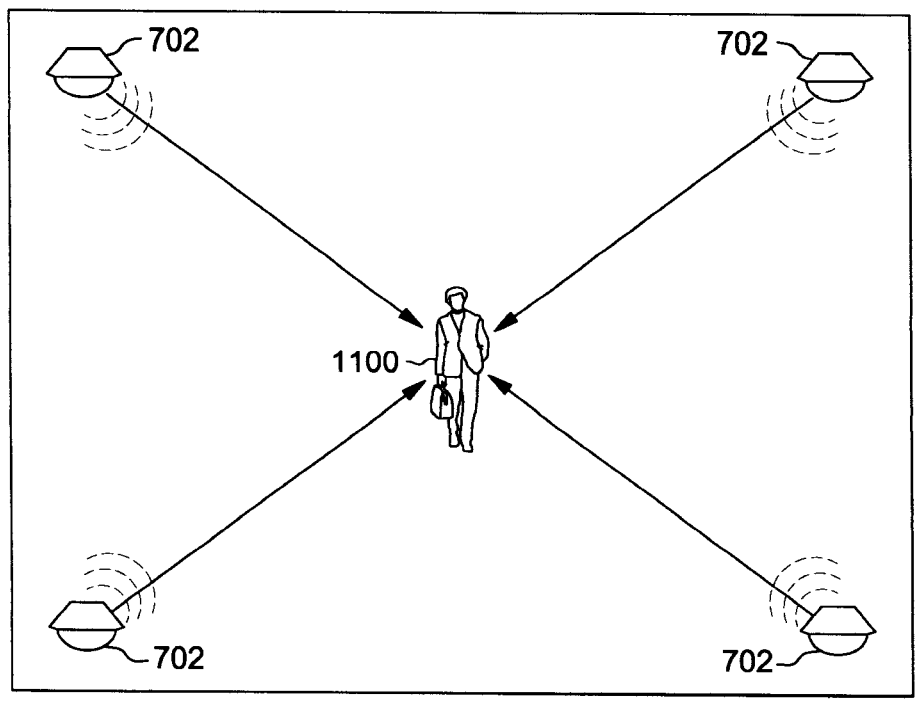
FIG. 11 shows a plurality of HBS's being used to locate a person's position in a building.

FIG. 11 shows a plurality of HBS's 702 being used to determine a person's mobile device (e.g., phone, tablet, smartwatch, etc.) 1100 position in a building using the person's phone IP or wireless mac address and/or mobile equipment identifier (MEID) or similar ID and comparing between the plurality of detected locations to arrive at the approximate coordinates of the mobile device 1100. Although shown inside, the HBS's might also perform the same function in an outside location.

Figure 12A:
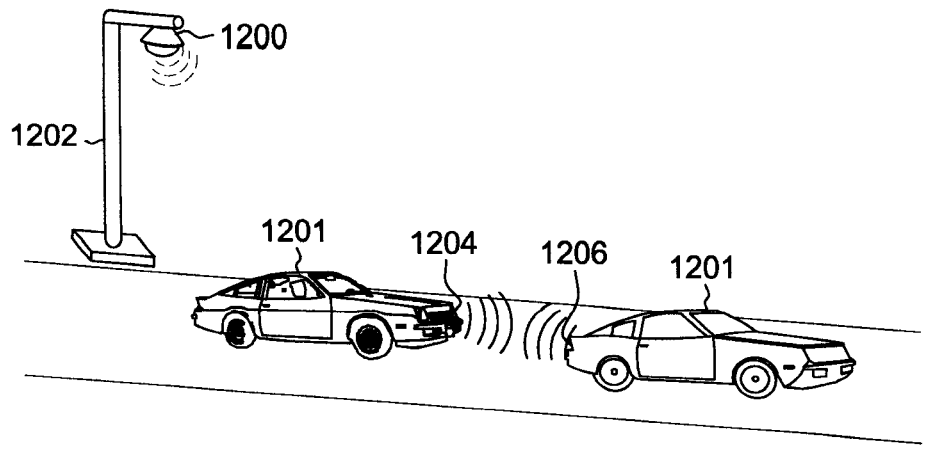
FIGS. 12A and 12B show HBS's in operation with vehicles.
Figure 12B:
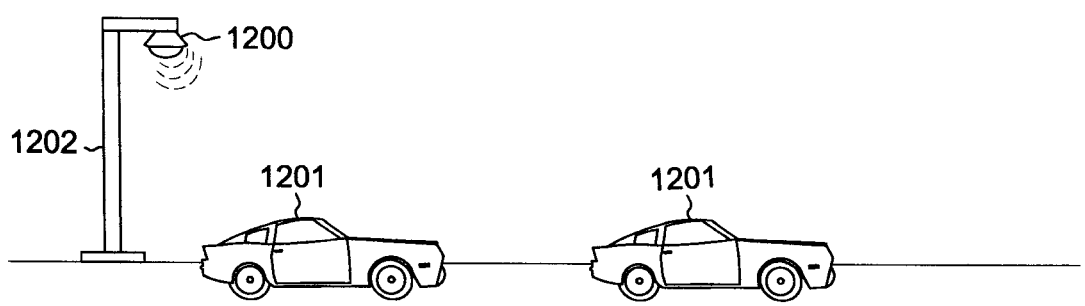

The HBS housings 100, 300, 300a, 400, and/or 702 can also be installed into or on vehicles to make them smarter and help drivers avoid accidents. FIG. 12A shows an HBS 1200 mounted in a light pole power source/Ethernet connection 1202 which can detect the presence of vehicles 1201 and car accidents and warn other vehicles and emergency response authorities of accidents. In this embodiment vehicle 1201 may have remote wireless terminals. "Remote wireless terminal" as used herein may be device that is capable of transmitting and receiving data by wireless communication methods, e.g., by ZigBee®, Bluetooth®, WiFi, 2G (e.g., Global System for Mobile Communications (GSM)), 3G (e.g., Code Division Multiple Access (CDMA), Wideband CDMA (WCDMA), Time Division Synchronous CDMA (TD-SCDMA)), WiMax, 4G LTE, and/or 5G cellular communication standards. The HBS 1200 may be an embodiment with a camera located therein and can detect an accident in that manner. In an alternative embodiment, the HBS 1200 may receive wireless signals from HBS's 1204, 1206 installed in the light ports of the vehicles 1201. The wireless signals may be used for either normal communications and/or may be used to alert the HBS 1200 that an accident has taken place. HBS's 1204 and 1206 may also signal to the drivers of the vehicles 1201 that they are too close to each other for safety and that an accident may happen as a result. The HBS's 1204, 1206 can be installed in the front, back or side of the vehicles 1201 or in a plurality of locations on the inside or outside of the vehicle 1201. HBS's 1200, 1204, and/or 1206 may signal other HBS housings in their mesh network that an accident has occurred. The power module 102 shown in HBS 100 and/or 300 may be present in HBS's 1204, 1206 and may be configured to provide electricity generated from kinetic energy of the movement of the vehicle (e.g., acceleration and deceleration of the vehicle, hitting bumps in the road) to other modules in the HBS's 1204, 1206. Also, power module 102 may be present in HBS 1200 which is mounted on the light pole and may be configured to provide electricity generated from kinetic energy of the swaying movement of the light pole to other modules in the HBS 1200. FIG. 12B shows the HBS 1200 on a light pole 1202 assisting in the parking of vehicles 1201. The HBS 1200 sends signals to vehicle driver's interface device (e.g., display screen) in the vehicle and/or mobile device in the vehicle (e.g., phone, tablet, smartwatch, etc.) with a speaker or LED indicator to stop or slow down. The signals can be sent via wireless communication or over a wired connection in pole 1202 to ultimately be sent wirelessly to the vehicle 1201. HBS 1200 may detect that other vehicles are using radar, laser, camera, or other wireless systems and signal as such the vehicles 1201.

Figure 13:
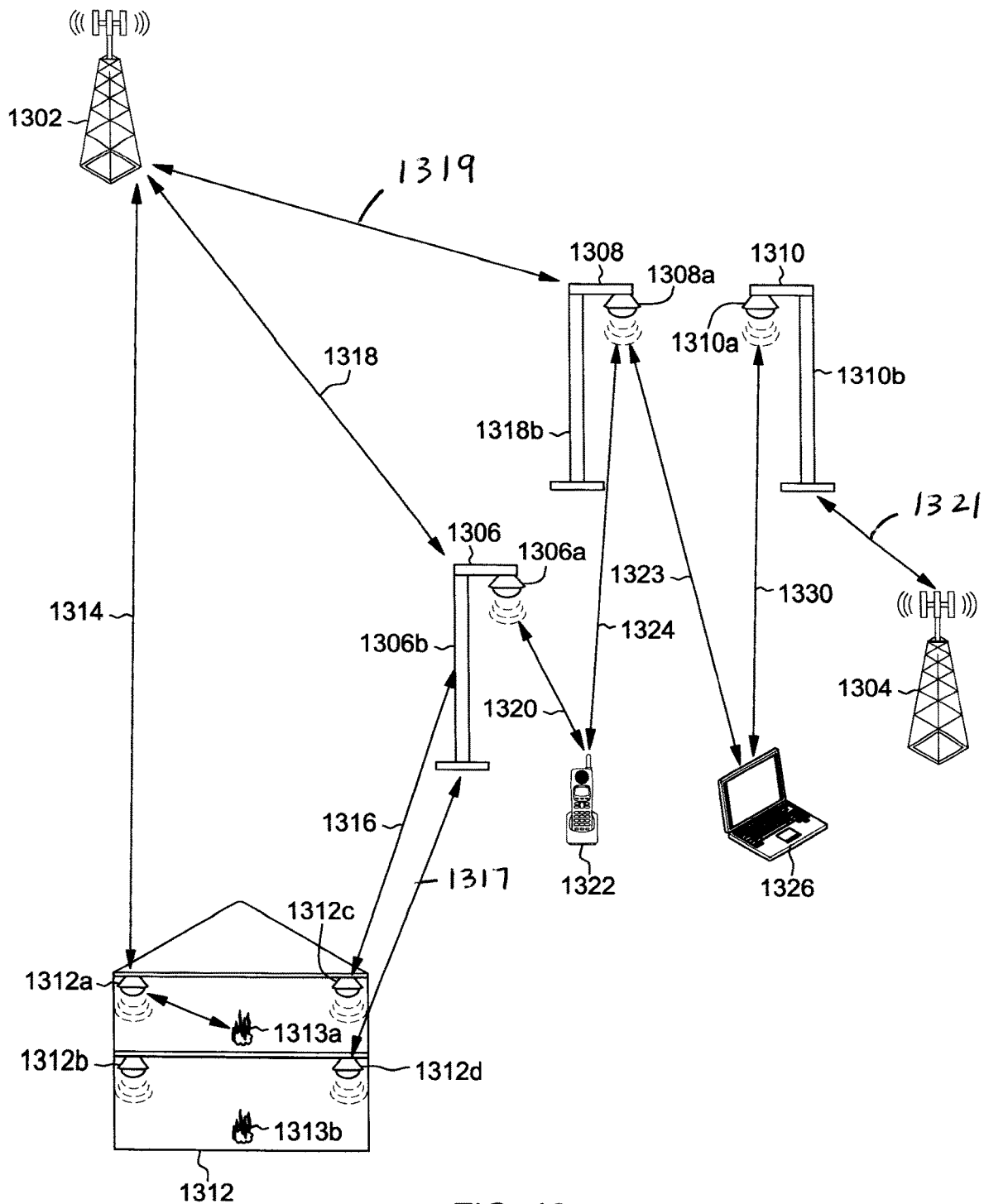
FIG. 13 illustrates a system in which a plurality of HBS's operate at different wireless standards and frequencies.

FIG. 13 demonstrates an environment in which a plurality of HBS's 100, 300, 300a, 400, 702, and 1200 can operate at different standards (e.g., WiFi, 3G, LTE, mm-wave, microwave, etc.) and frequencies (e.g., 700 MHz to 3.5 GHz). Large base stations 1302 and 1304 are typically where the wireless antenna and network communications are placed. These base stations 1302 and 1304 usually include a transmitter/receiver, antenna tower, and radio controllers for maintaining communications with mobile devices within a given range. Base stations 1302 and 1304 are in communication with a plurality of poles 1306, 1308 and 1310 having corresponding HBS's 1306a, 1308a, and 1310a. The communication links 1318 and/or 1319 may be wired communications such as through Ethernet over Power Line or a wireless communications using standards previously discussed with regard to the HBS's such as 3G, 4G, 5G, microwave, WiMax, and/or mm-wave. Pole 1306 also includes a power line 1306b which allows for communication to a building 1312 from HBS 1306a through a wired connection 1317 such as an Ethernet over Power Line (as previously discussed) or wirelessly 1316. Pole 1310 includes power line 1310b which allows for a communication link 1321 with the base station 1304 using Ethernet over Power Line, wireless or the like. Building 1312 contains HBS's 1312a, 1312b, 1312c and 1312d. Each of these HBS's may communicate with the base stations 1302 and 1304 in different ways. For example, in case of a fire in building 1312, the HBS's 1312a and 1312b detect fire 1313. HBS 1312a communicates the fire information wirelessly 1314 to base station 1302. HBS 1312b communicates the fire information wirelessly 1316 to HBS 1306a which then relays the information wirelessly at approximately 3.5 GHz to base station 1302. Simultaneously, another fire 1313 is detected on the bottom floor of building 1312 by HBS's 1312d which communicates through link 1317 that fact by the Internet through power line 1306b (e.g., using Ethernet over Power Line) with HBS 1306a. HBS 1306a relays it to base station 1302 as previously described. HBS 1306a can also receive and transmit wireless communications 1320 at approximately 1.9 GHz from and to a mobile device 1322. Mobile device 1322 can communicate through wireless link 1324 over WiFi with HBS 1308a. Portable computer 1326 may also communicate with HBS 1308a through wireless link 1323 at a frequency of approximately 900 MHz and with HBS 1310a wirelessly 1330 at approximately 1.7 GHz.

Figure 14:
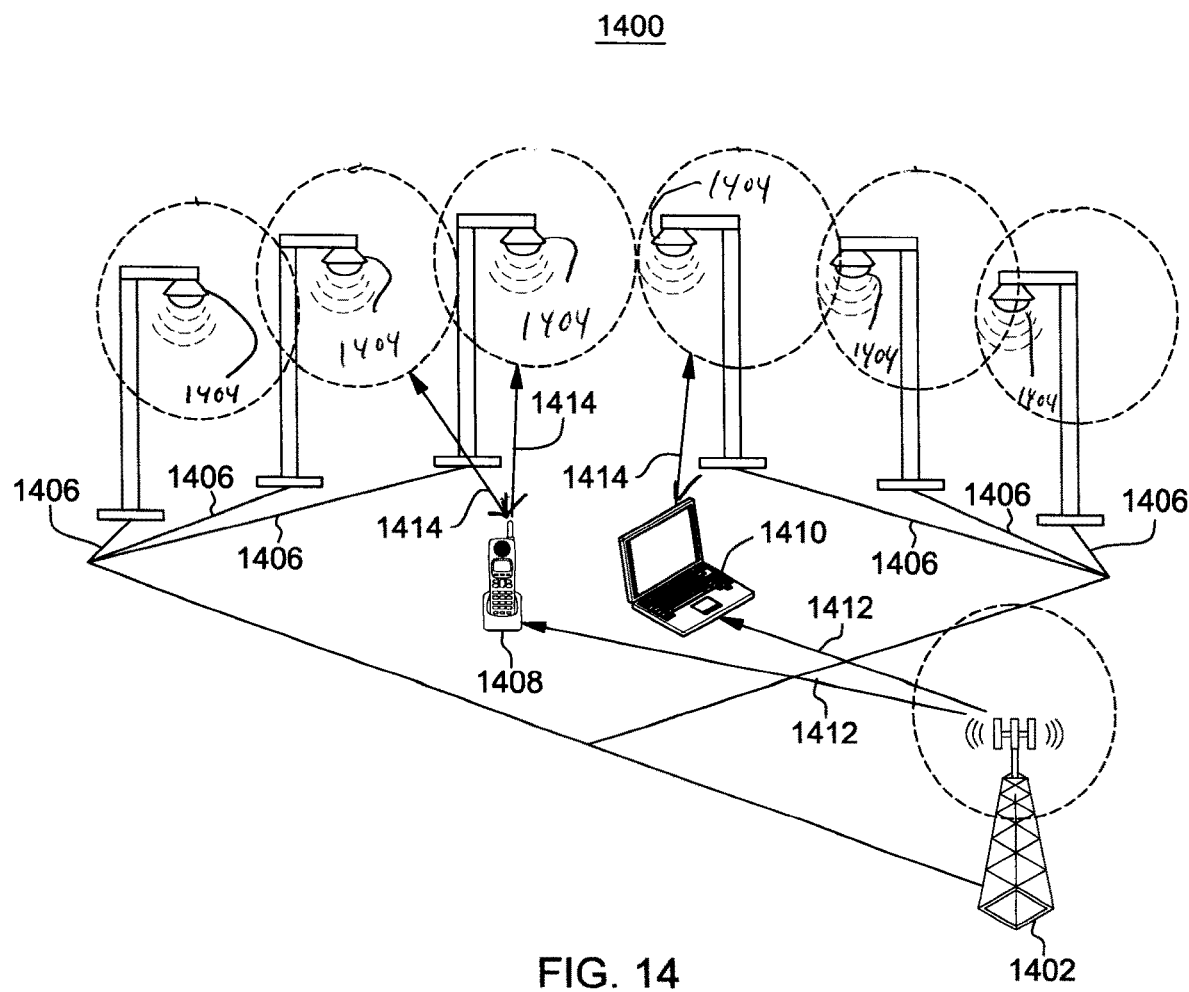
FIG. 14 illustrates a mesh network or giant antenna array application of HBS's.

FIG. 14 illustrates a mesh network or giant antenna array application 1400 for backhaul. In this embodiment, a base station 1402 is connected over the Internet to a plurality of power poles each having an HBS 1404 through power lines 1406 or a high speed line (e.g., fiberoptic). Mobile device 1408 and computer 1412 each receive an approximately 800 MHz downlink 1414 from base station 1402 and communicate with HBS's 1404 on the poles through approximately 3.6 GHz uplinks.

Figure 15:
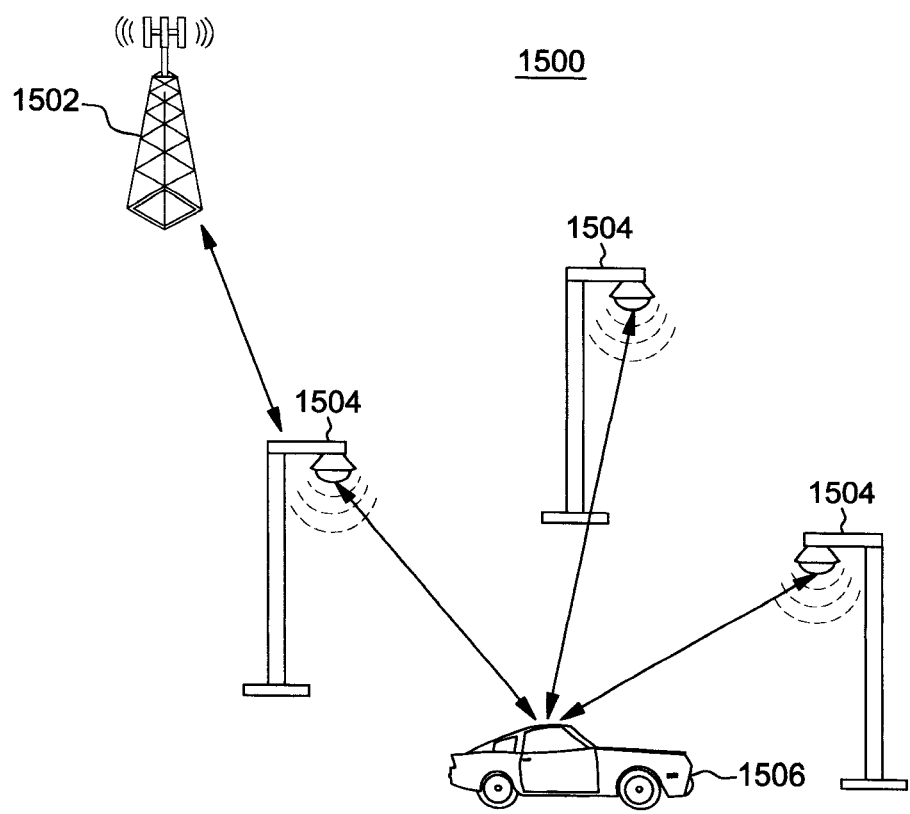
FIG. 15 illustrates a system in which the HBS's use onboard sensors to locate an object position and map the three-dimensional characteristics of the object such as a vehicle.

FIG. 15 shows another mesh network or giant antenna array application 1500 for backhaul. In this embodiment, a base station 1502 is connected wirelessly to a plurality of power poles each having an HBS 1504. Each HBS 1504 uses onboard sensors such as cameras, ultrasounds, microphones to locate an object (e.g., vehicle) 1506 position and map the characteristics (e.g., 3D characteristics) of the object 1506. For example, this system may be used to track package deliveries. The object 1506 position may be triangulated with ultra sound or cameras. In addition, HBS's 1504 may have sound detection equipment to find the location of sounds like gun fire and forward the location information to the appropriate authorities.

Figure 16A:
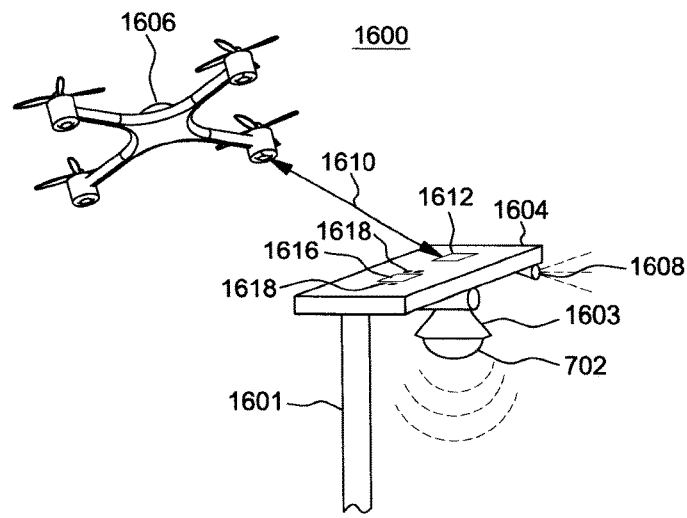
FIGS. 16A-16J disclose an HBS system which may be used to control and charge Unmanned Aerial Vehicles (UAVs).

FIG. 16A shows a combination unit or system 1600 which has an HBS 702 with any or all of the components and functionalities of the previously described HBS's (including HBS 100, 300, 300*a*, and/or 400) in a housing 1603 mounted on a utility pole 1601 with a landing pad 1604 attached for an unmanned aerial vehicle (UAV) or drone 1606. The utility pole 1601 is typically a light pole but it could also be a telephone poll or some other type of pole. The UAV 1606 may contain a remote wireless terminal (e.g., an HBS). Alternatively, the fixture on the pole 1601 can be just a standard lighting fixture containing an incandescent, fluorescent, low pressure sodium, high intensity discharge or LED lamp without an HBS 702. In this alternative embodiment, the landing pad 1604 may have a beacon (or communication device) 1608 attached which has the same components and performs the same communication functions of an HBS (i.e., HBS 100, 300, 300*a*, 400 and/or 702) as discussed above and below in this description. The beacon 1608 may be detachable. Also, the pad 1604 with the HBS 702 (or beacon 1608) may be mounted inside a building, in a building or on any high spot. The pole 1601 is usually in a height range of approximately 20 to 100 feet tall with the average poll being approximately 35 feet to give the UAV clearance for landing and takeoff. The landing pad 1604 may be made of a solid, light weight material. In alternative embodiments, the landing pad might be made of a metal or plastic mesh or periodically have a plurality of drain hole perforations or channels to avoid harm due to inclement weather such as rain, snow or ice. In other alternative embodiments, the landing pad may be also be mounted at a slant to drain off rain or melting snow or ice. HBS 702 may have a light sensor which controls when to turn the light ON and OFF for night or day time but will keep the HBS 702 and its wireless communications always on. The landing pad 1604 provides a charging, parking and resting station or pad where a UAV 1606 can stop and recharge. For example, a UAV delivering groceries may use the frequently located HBS's as a navigational guide, communication links, and or resting/recharging spot. The landing pad 1604 may have its charging functions controlled by an HBS 702 (i.e., typically a module inside HBS 702). Another feature that may be integrated into the HBS 702 is a UAV landing module. The UAV landing module may contain navigation and wireless communication functions or, alternatively, the UAV landing module might be coupled to a separate navigation module and wireless communication module.

Figure 16B:
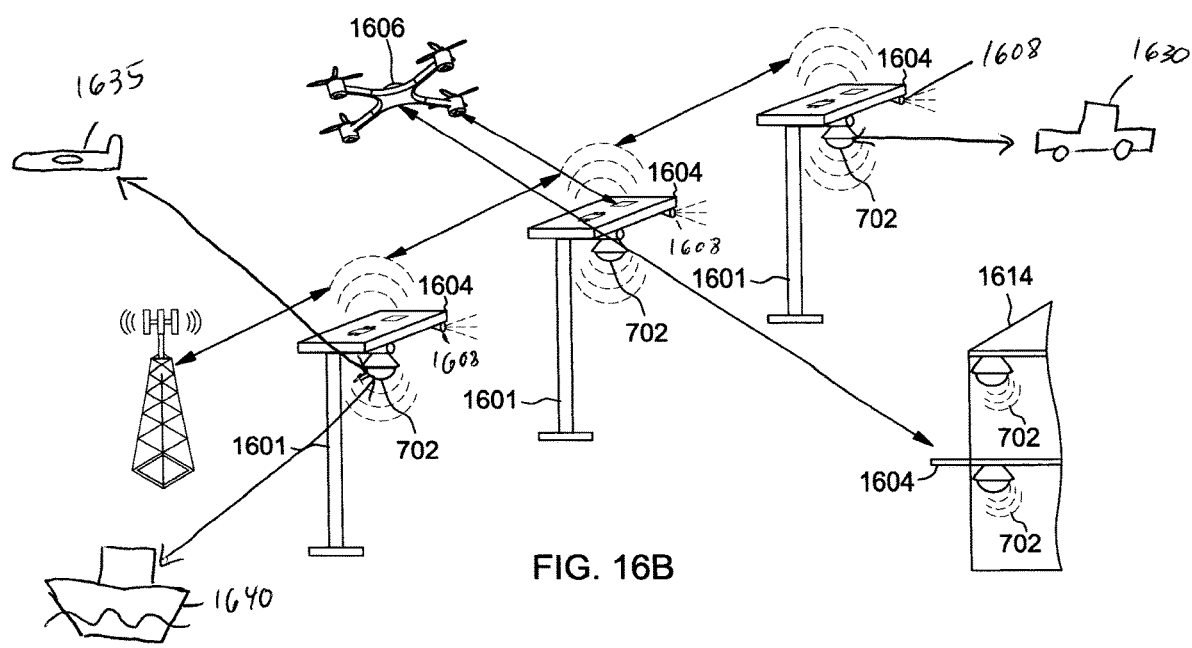

FIG. 16B shows a system of combination poles 1601 having HBS's 702 which together can be used to control by radio signals the UAV 1606 so that the UAV does not lose control contact and communication. The control communication can be on any frequency (e.g., 400 MHz to 6 GHz). FIG. 16B further illustrates a landing pad 1604 attached to the side of a building 1614 and the UAV 1606 being controlled by HBS's 702 located inside (or exterior to) the building 1614. Communication between an HBS 702 and a UAV 1606 might include communications of sensor data, image data, video data and UAV control and command data. The communication relationship between an HBS 702 mounted on or in a pole, building, hilltop or similarly situation spot and a UAV can also be implemented between an HBS and a land-based (e.g., automotive) vehicle 1630, a manned aerial vehicle 1635 and/or a marine vessel 1640. The HBS(s) 702 may conduct communications with all four types of these moving objects simultaneously depending on the type of communication modules integrated into the HBS 702. The objects 1606, 1630, 1635 and 1640 each may have a remote wireless terminal(s) (e.g., HBS(s)) mounted on the outside and/or inside or might use standard communications gear. Correspondingly, poles 1601 may just have standard communications gear and be in communication with the 4 types of objects 1606, 1630, 1635 and/or 1640 which have an HBS 702 mounted in or thereon. The communication between the HBS(s) 702 and these 4 types of objects (UAV, manned aerial vehicle, land based vehicle, and/or marine vessel) may occur while they are stationary or in motion. A network of HBS's 702 can relay high rate data such as sensor, image and/or video data to and from the 4 types of objects to cloud servers or vehicles/traffic control centers.

Figure 16C:
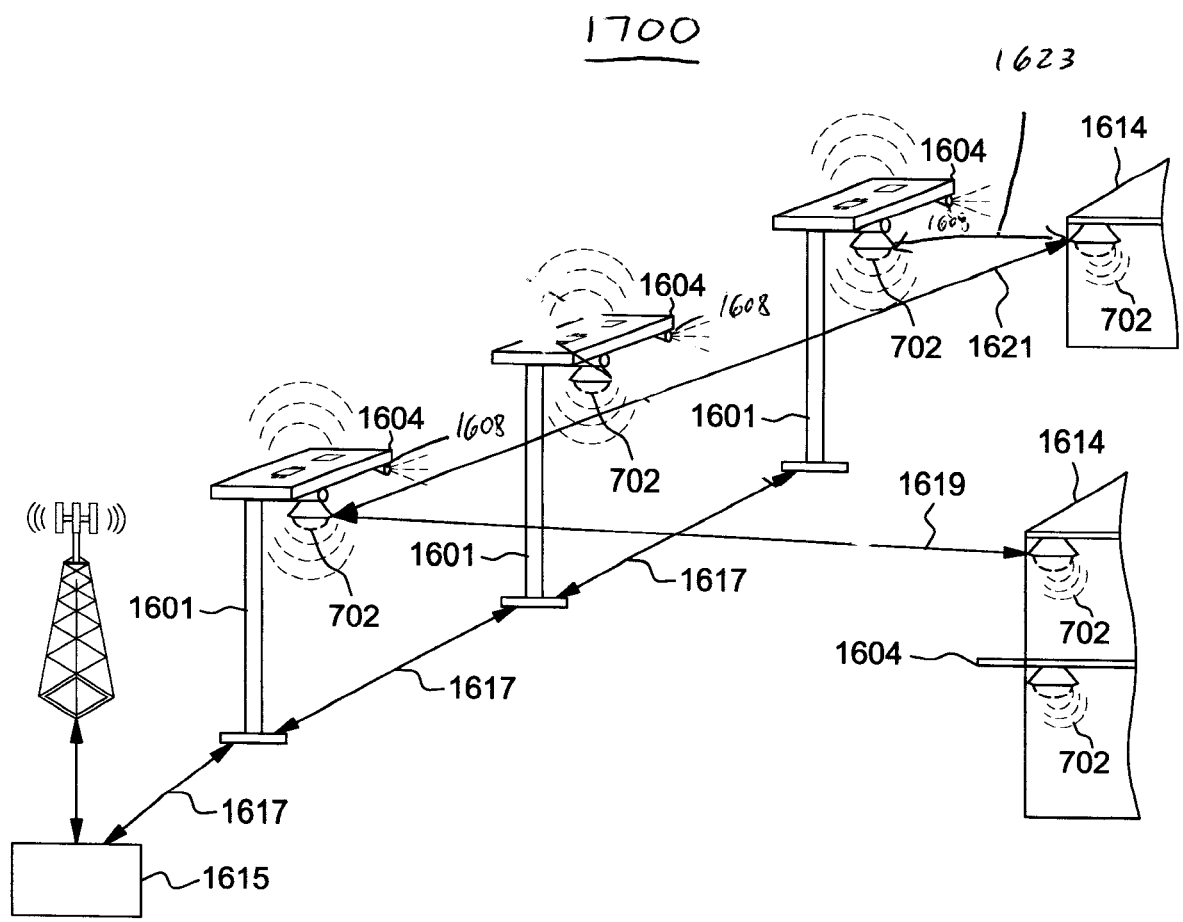

FIG. 16C shows a system 1700 of poles 1601 each connected to a fiber optic or other high speed network 1617 (e.g., Ethernet, coaxial, backhaul, Internet) which is connected to a node 1615 which is connected to a base station 1620. Node 1615 may be a communication data center functioning as an Internet Service Provider Network 1617 or can be a backhaul communication line or a combination power/backhaul communication line (e.g., Ethernet over Power). The HBS's 702 are in wireless communication 1619 and 1621 with the HBS's located in the buildings 1614. The HBS's may communicate through links 1619 and 1621 in a plurality of wireless standards as previously discussed (e.g., mm-wave, microwave, approximately 60 GHz). Links 1619 and 1621 are capable of carrying data intense communications such as movies, etc.

Figure 16D:
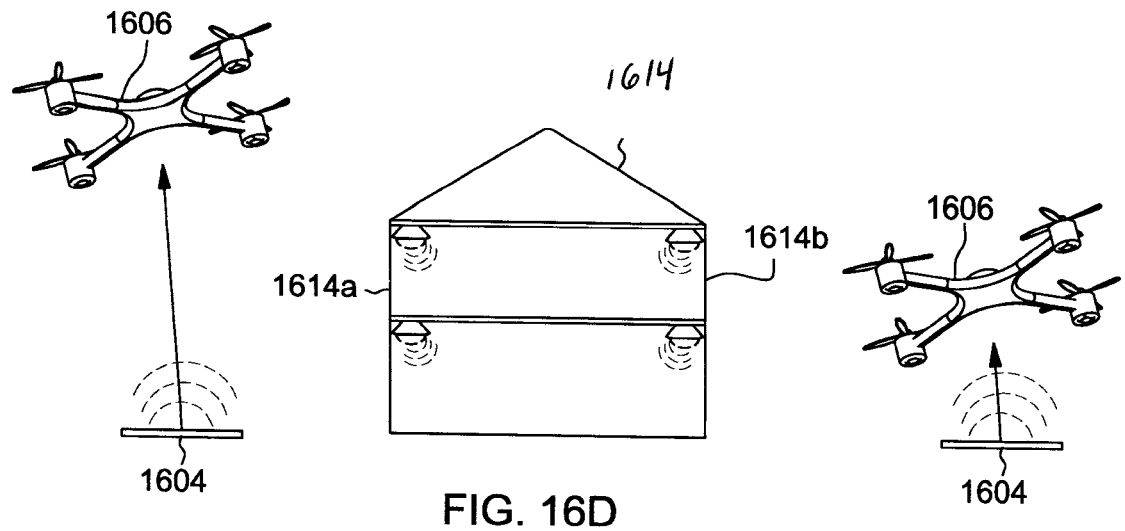
Figure 16E:
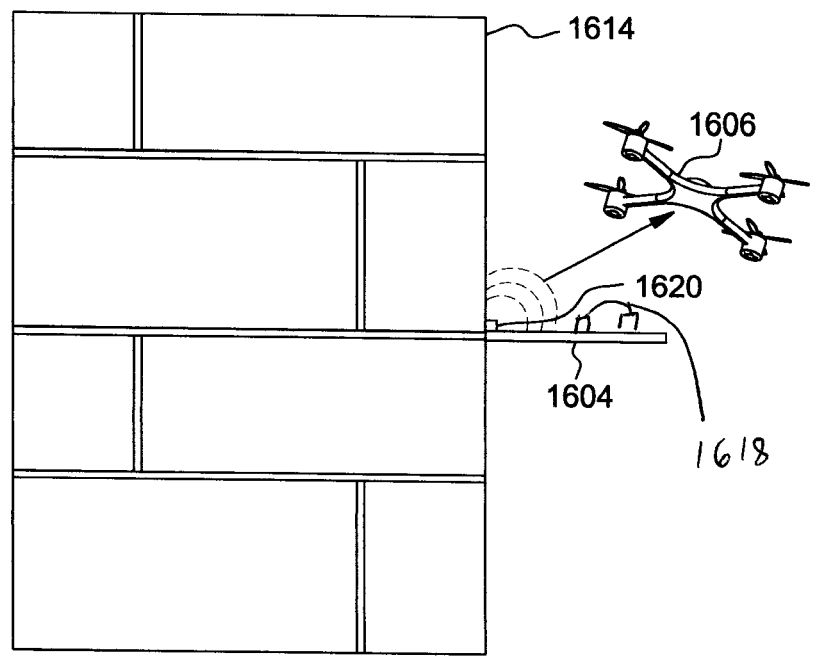

FIGS. 16D and 16E disclose landings locations for the UAV 1606 in more detail. Building 1614 may be a large commercial location or a small residential dwelling. It has landing pads in the front side (1614*a*) and back side (1614*b*) of the building. The back side of the building 1614*b* will possibly provide more security for valuable deliveries. Each of the landings pads 1604 could provide beacon signals through a communication module to the UAVs 1606 to direct them where to land. The landing pads 1604 are further configured to wirelessly send messages to the owner/occupant of the building that the package was delivered by the UAV 1606. FIG. 16E shows an alternative embodiment in which the building 1614 has the landing pad 1604 mounted several floors above the street. The landing pads 1604 may be designed to electronically provide payment for goods upon delivery by the UAV 1606. The landing pads 1604 can used to receive samples that can be tried by the prospective customer and then returned if not satisfied.

As discussed above, the landing pad 1604 can contain a charging mechanism 1616 to recharge a UAV 1606. In alternative embodiments, the landing pads 1604 may be equipped with magnets, clamps or some other type of mounting device (shown as 1620 in FIG. 16E) for attaching the landing pads to the side of the building 1614. Also, the landing pad 1604 may include magnets (or other mechanical devices such as clamps) 1618 on the landing pad 1616 to keep a UAV 1606 in a charging position or from dipping over or being blown off the landing pad 1604 by the wind.

Figure 16F:
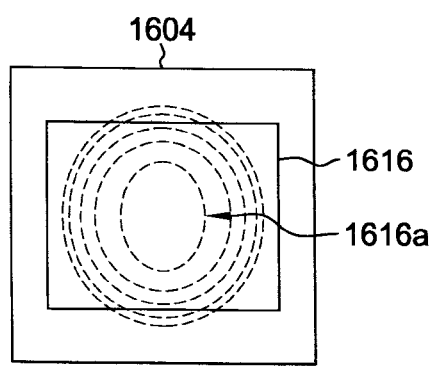
Figure 16G:
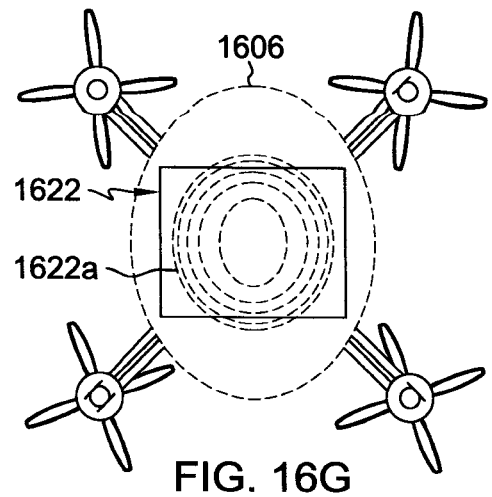
Figure 16H:
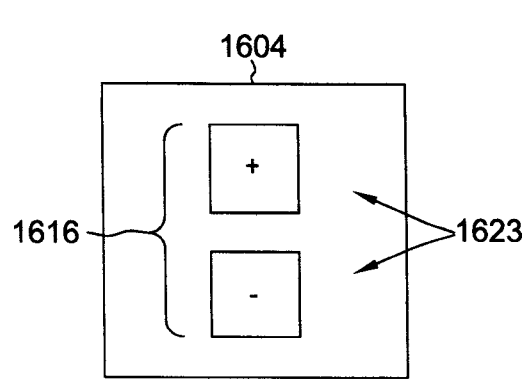
Figure 16I:
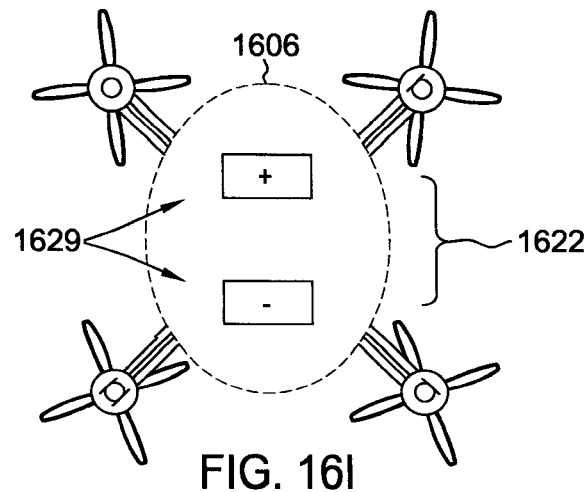

FIG. 16F is a close up of the landing pad 1604 showing the charging mechanism 1616 which can be a wireless or direct metal contact that is integrated into the landing pad 1604. For example, the charging mechanism can be wires such as a transmission coil 1616*a*. Energy is transmitted from the transmission wires (e.g., coil) 1616*a* to a UAV 1606 having a corresponding charging mechanism 1622 (e.g., receiving coil 1622*a*) by electromagnetic induction as shown in FIG. 16G. FIG. 16H is a close up of the landing pad 1604 showing the charging mechanism 1616 which can be a pair of direct metal contacts 1623 that are integrated into the landing pad 1604. FIG. 16I illustrates a corresponding charging mechanism 1622 on the drone 1606 which is also includes a pair of metal contacts 1624.

Figure 16J:
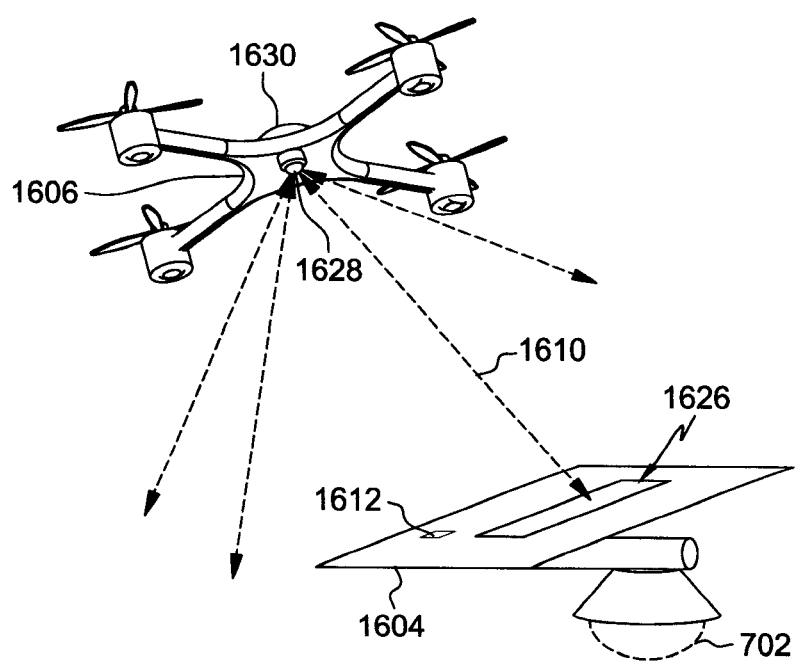

The drone 1606 can use many techniques to land on the landing pad 1604. FIG. 16J shows a laser beam 1610 (e.g., infrared laser) which guides the UAV 1606 to the landing pad 1604. When using laser guided landing, the landing navigation can be done by a reflective surface (e.g., reflective tape) 1626 on the landing pad 1604. The laser may be pulsed or modulated (modulated laser gives better accuracy and range). The drone 1606 can carry a laser transceiver 1628 on a rotating turret 1630 so that it can scan the area for the landing pads. After the laser signal is transmitted it reflects back to the drone 1606 from the reflective surface 1626 and the distance is automatically calculated by processors in the drone 1606. Alternatively, the location of the landing pad 1604 may be a previously mapped and programmed GPS location in the drones 1606 memory. The drone 1606 can have cameras that can be used to scan the area and compare to the map data base such as Google® street view, Bing® data base, Mapquest®, or similar image database. This information is compared to the landing maps and the destination requests that are stored in the cloud or the drone memory. This allows the drone to decide whether to land or not. Also, as previously discussed, the UAV 1606 may use short range communication with the landing pad 1604 in which the landing pad has the built in wireless transceiver 1612 that allows it to communicate with the drone 1606 and the drone's headquarters.

The foregoing described embodiments have been presented for purposes of illustration and description and are not intended to be exhaustive or limiting in any sense. Alterations and modifications may be made to the embodiments disclosed herein without departing from the spirit and scope of the invention. No language in the specification should be construed as indicating any non-claimed element as essential to the practice of the invention. The actual scope of the invention is to be defined by the claims. In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

The definitions of the words or elements of the claims shall include not only the combination of elements which are literally set forth, but all equivalent structure, material or acts for performing substantially the same function in substantially the same way to obtain substantially the same result.

The terms "a", "an" and "the" mean "one or more" unless expressly specified otherwise. The terms "including", "comprising" and variations thereof mean "including but not limited to" unless expressly specified otherwise. The term "plurality" means "two or more" unless expressly specified otherwise. The phrase "at least one of", when such phrase modifies a plurality of things (such as an enumerated list of things) means any combination of one or more of those things, unless expressly specified otherwise. The use of any and all examples, or exemplary language ("e.g." or "such as") provided herein, is intended merely to better illuminate the invention and does not pose a limitation on the scope of the invention unless otherwise claimed.

Neither the Title (set forth at the beginning of the first page of the present application) nor the Abstract (set forth at the end of the present application) is to be taken as limiting in any way as the scope of the disclosed invention(s). The title of the present application and headings of sections provided in the present application are for convenience only, and are not to be taken as limiting the disclosure in any way.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The invention claimed is:

1. A Handy Base Station (HBS) comprising:
   a housing having a base portion that is configured to fit into a vehicle socket power source;
   a backup power supply capable of powering operations of the HBS when the power source is not providing power;
   a communication module which is capable of communication, networking, command and control including receiving from and transmitting to a plurality of remote wireless terminals using 4G or 5G wireless standard signals;
   said communication module further being capable of backhauling received transmissions to a cellular network; and
   wherein the HBS is capable of detecting an accident and instructing the communication module to send out a distress message.

2. The HBS of claim 1, furthercomprising:
   a power module; and
   said communication module connected through an Ethernet over power line to backhaul to the network.

3. The HBS of claim 1, wherein the HBS is capable of sending wireless communications to a second HBS.

4. The HBS of claim 1, wherein the HBS is capable of sending wireless communications from the communication module to exert control over another HBS.

5. The HBS of claim 1, further comprising:
   an image mapping camera capable of capturing an image of a moving object and reconstructing in a two dimensional or three dimensional image.

6. The HBS of claim 1 furthercomprising:
a sensor for monitoring the environment and reporting through the communication module; and
wherein the sensor is from a group of sensors consisting of a: temperature sensor, light sensor, electrical sensor, chemical sensor, particle sensor, proximity sensor, imaging sensor, smoke sensor, air flow sensor, carbon monoxide sensor, nitrogen sensor, biochemical sensor, and sound sensor.

7. The HBS of claim 6, wherein the communication module is capable of sending a message in the event of a detection by one of the environmental sensors.

8. The HBS of claim 1, furthercomprising:
a light emitting diode (LED); and
wherein the LED and communication module are detachable.

9. The HBS of claim 1, wherein the communication module is an Access Point.

10. The HBS of claim 1, furthercomprising:
a camera enabling the HBS to be gesture-controlled.

11. The HBS of claim 1, further comprising:
a microphone; and
wherein the HBS is configured to be controlled using sound received by the microphone.

12. The HBS of claim 1, furthercomprising:
an environmental sensor; and
wherein the environmental sensor is configured to respond to infrared or radio frequency signals to control the HBS.

13. The HBS of claim 1, wherein the communication module is capable of repeating signals received from a remote wireless terminal to another HBS.

14. The HBS of claim 1, wherein the base portion is capable of being fitted into a lamp source socket.

15. The HBS of claim 1, wherein the communication module is detachable from the HBS.

16. The HBS of claim 1 further comprising:
a sensor for monitoring the environment and reporting through the communication module; and
wherein the sensor is from a group of sensors consisting of a: electrical sensor, chemical sensor, particle sensor, proximity sensor, imaging sensor, air flow sensor, carbon monoxide sensor, nitrogen sensor, and biochemical sensor.

17. The HBS of claim 1, further comprising:
a plurality of antennas protruding from the HBS to increase reception and transmission range.

18. The HBS of claim 1, whereinthe backup power source is a battery.

19. The HBS of claim 18, wherein the battery is rechargeable.

20. A Handy Base Station (HBS) comprising:
a housing having a base portion that is configured to fit into a vehicle socket power source;
a backup power supply capable of powering operations of the HBS when the power source is not providing power;
a processor capable of controlling operation of the HBS;
a communication module which is capable of communication, networking, command and control including receiving from and transmitting to at least one remote wireless terminal using a 4G or 5G wireless standard and said communication module further being capable of backhauling received transmissions to a network;
a sensor module for monitoring the environment and reporting through the communication module;
wherein the sensor module is from a group of sensors consisting of one of an: electrical sensor, chemical sensor, particle sensor, proximity sensor, air flow sensor, carbon monoxide sensor, nitrogen sensor, and biochemical sensor; and
wherein the HBS is capable of detecting an accident and instructing the communication module to send out a distress message.

21. The HBS of claim 20 further comprising:
an light emitting diode (LED) module capable of providing light; and
wherein the communication module, sensor module and LED module are capable of being detached from the HBS.

22. The HBS of claim 20, wherein the backup power source is a battery.

23. The HBS of claim 22, wherein the battery is rechargeable.

24. A Handy Base Station (HBS) comprising:
a housing having a base portion that is configured to fit into a vehicle socket power source;
a backup power supply capable of powering operations of the HBS when the power source is not providing power;
a light emitting diode (LED) capable of providing light; and
a communication module which is capable of communication, networking, command and control including receiving from and transmitting to a plurality of remote wireless terminals using 4G or 5G wireless standard signals;
said communication module further being capable of backhauling received transmissions to a cellular network; and
wherein the HBS is capable of detecting an accident and instructing the communication module to send out a distress message.

* * * * *